United States Patent
Tago

(10) Patent No.: US 8,086,984 B2
(45) Date of Patent: Dec. 27, 2011

(54) METHOD OF DESIGNING SEMICONDUCTOR INTEGRATED CIRCUIT HAVING FUNCTION TO ADJUST DELAY PASS AND APPARATUS FOR SUPPORTING DESIGN THEREOF

(75) Inventor: Satoshi Tago, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 288 days.

(21) Appl. No.: 12/320,643

(22) Filed: Jan. 30, 2009

(65) Prior Publication Data
US 2009/0199144 A1 Aug. 6, 2009

(30) Foreign Application Priority Data
Feb. 6, 2008 (JP) ................................ 2008-027062

(51) Int. Cl.
G06F 17/50 (2006.01)

(52) U.S. Cl. ........ 716/115; 716/108; 716/109; 716/113; 716/114; 716/133

(58) Field of Classification Search .................. 716/106, 716/108, 109, 113, 115, 132, 133, 134, 114
See application file for complete search history.

(56) References Cited

U.S. PATENT DOCUMENTS

| 6,229,363 B1* | 5/2001 | Eto et al. ......................... 327/158 |
| 6,934,872 B2* | 8/2005 | Wong et al. .................... 713/503 |
| 7,079,998 B2* | 7/2006 | Tien et al. ......................... 703/18 |
| 2003/0154065 A1* | 8/2003 | Gauthier et al. ............... 703/14 |
| 2004/0212428 A1* | 10/2004 | Ode et al. ..................... 330/149 |
| 2006/0028254 A1* | 2/2006 | Feng ............................ 327/153 |

OTHER PUBLICATIONS

"Voltagestorm power and Power Rail Verification Datasheet", pp. 1-4, Cadence, @2006.*
"Dynamic IR-drop Analysis with Voltagestorm Dynamic Gate (VSDG) using different Power Grid Views for Cell Modeling", by Steffen Kosinski, @ May 16, 2007.*
"Method For Converging Timing In Consideration Of Signal Integrity" OKI Technical View No. 196, vol. 70, No. 4, pp. 50-51, Oct. 2003.

* cited by examiner

Primary Examiner — Thuan Do
Assistant Examiner — Nha Nguyen
(74) Attorney, Agent, or Firm — McGinn IP Law Group, PLLC

(57) ABSTRACT

A power noise cycle is obtained from a dynamic IR drop analysis and a delay of a delay pass is a multiple of the noise cycle. Thereby, a delay increment and a delay decrement of a power noise amount (delay time×power noise amplitude) received when an internal signal of the semiconductor integrated circuit passes through a delay pass circuit are approximately the same.

8 Claims, 8 Drawing Sheets

RELATED ART FIG. 1

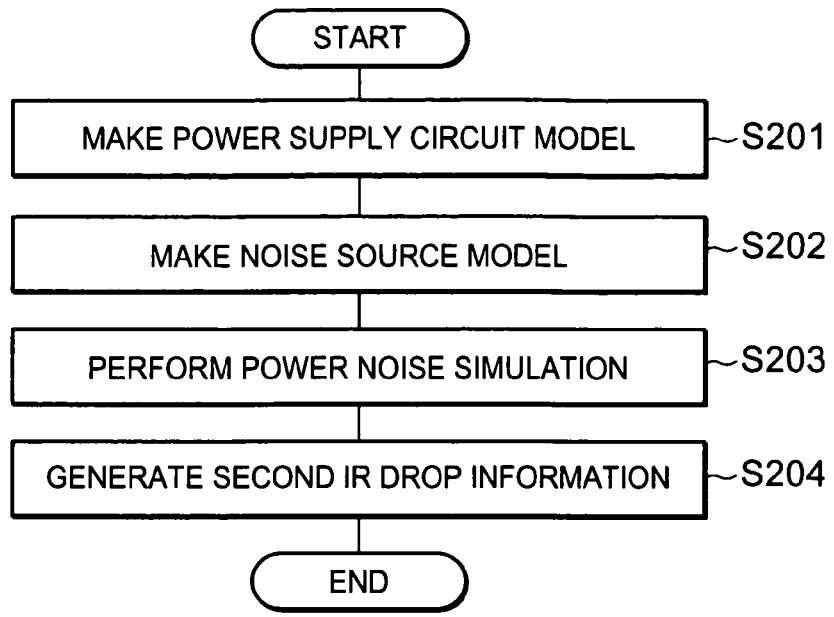
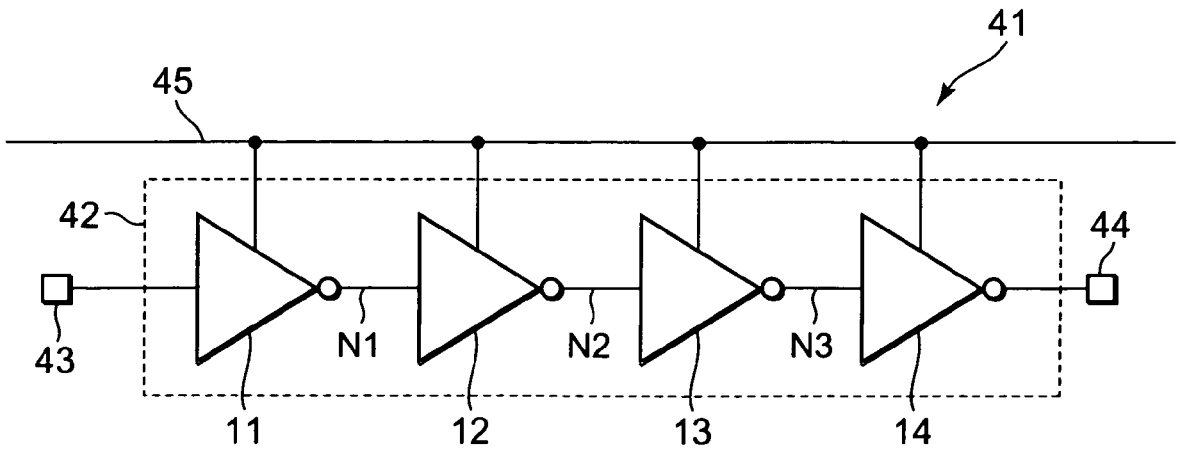

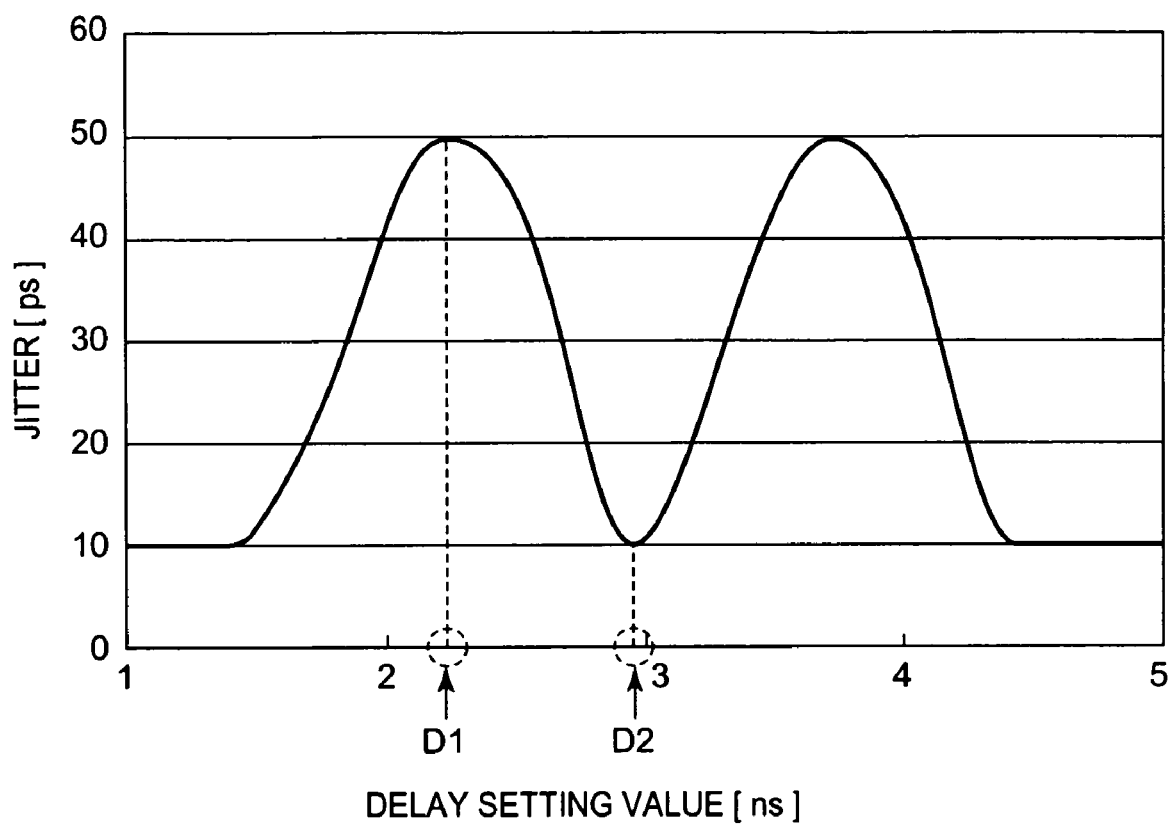

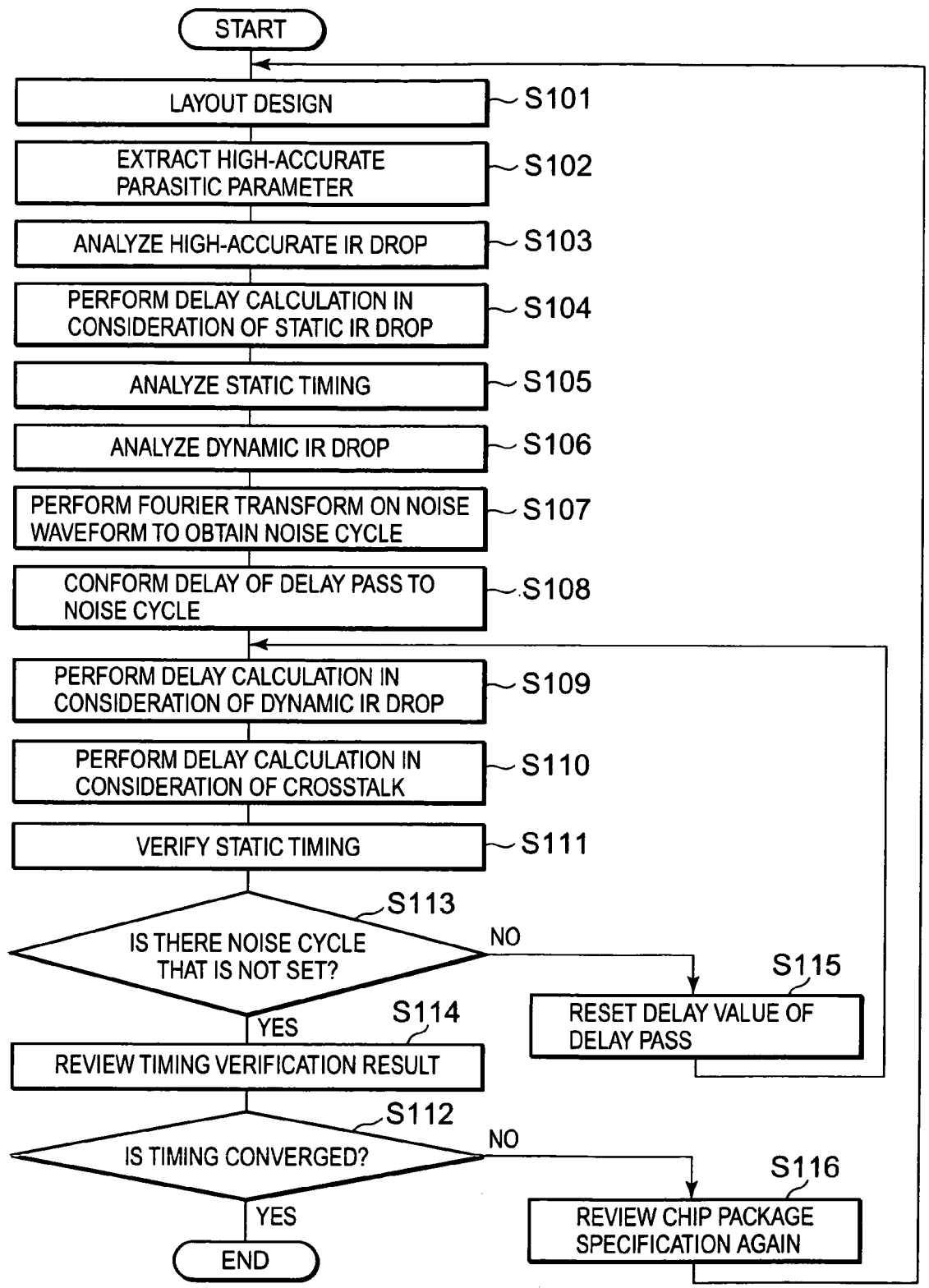

METHOD OF DESIGNING SEMICONDUCTOR INTEGRATED CIRCUIT HAVING FUNCTION TO ADJUST DELAY PASS AND APPARATUS FOR SUPPORTING DESIGN THEREOF

BACKGROUND OF THE INVENTION

1. Field of the Invention

The present invention relates to a method for designing a semiconductor integrated circuit and an apparatus for supporting a design of thereof.

2. Description of Related Art

Recently, the wide use of battery-driven products, such as a portable music player and a mobile phone, has spread. The products are provided with a semiconductor integrated circuit. As a result, there is ever increasing a demand for semiconductor integrated circuits that can consume less power. As a method to reduce power consumption of the semiconductor integrated circuit, a method of reducing power supply voltage has been known. When the power supply voltage is reduced, current flowing in an internal circuit is generally also reduced, while additionally making it possible to suppress a generation of noise. In recent years, however, as the speed of the semiconductor integrated circuit increases, the current amount may not be reduced only by reducing the power supply voltage and a generation amount of noise may not be reduced regardless of reducing the power supply voltage.

When the power supply voltage is reduced without reducing the power noise, an occupying rate of the power noise with respect to the power supply voltage is relatively large. At this time, a temporal fluctuation (hereinafter, referred to as a jitter) in a phase of an internal signal of the semiconductor integrated circuit is increased due to the power noise. A method of reducing a jitter due to the generation of power noise of the semiconductor integrated circuit has been known (for example, see Non-Patent Document 1).

FIG. 1 is a flow chart illustrating a delay calculation in consideration of SI (Signal Integrity) described in Non-Patent Document 1 and timing verification. A flow chart illustrated in FIG. 1 includes three processing steps.

A first processing step performs a delay calculation (step S3) in consideration of IR drop based on a parasitic parameter 101 obtained from a highly-accurate parasitic parameter extraction (step S1) and IR drop information 103 obtained from a highly-accurate IR drop analysis (step S2), thereby outputting first delay information 104. IR drop means that a voltage on a power source at a portion of a chip drops due to the influence of a wiring resistance. By using the information, a static timing analysis (step S4) is performed and a timing relationship between all the signal lines and a signal line that may be a noise source is extracted and output as timing information 102.

A second processing step performs a delay calculation (step S5) in consideration of crosstalk between the parasitic parameter 101 and the timing information 102 and outputs, as delay calculation results of a network affected by the crosstalk, second delay information 105 that is information different from the first delay information 104.

A third processing step performs a static timing verification (step S6) based on the first delay information 104 and the second delay information 105 that is information different from the first delay information 104 to determine whether timing is converged (step S7). By a series of sequences as described above, the timing convergence is completed by performing the timing verification while considering both the IR drop and the crosstalk (step S8).

[Non-Patent Document 1] "Method For Converging Timing In Consideration Of Signal Integrity" OKI Technical View No. 196, Vol. 70, No. 4, p. 50 to 51 (October, 2003)

SUMMARY

As technology for manufacturing a semiconductor advances, a method for converging timing according to the related art has a case where it is difficult to predict a jitter with high accuracy and reflect the jitter in a layout design. When the jitter increases, it is necessary to restrict operation conditions by specifying timing of a sequence circuit that configures a semiconductor integrated circuit. In order to further extend a design margin, a need exists for a technology that can perform the timing convergence with higher accuracy in a design step of the semiconductor integrated circuit.

A semiconductor integrated circuit of an exemplary aspect of the present invention is designed by a method of designing a semiconductor integrated circuit, the method includes:

[a] extracting a parasitic parameter 31 of the semiconductor integrated circuit based on a layout data of the semiconductor integrated circuit;

[b] performing a highly-accurate IR drop analysis on the semiconductor integrated circuit based on the layout data, generating first delay information 36 based on first IR drop information 33 obtained by performing the high-accurate IR drop analysis and the parasitic parameter 31, performing a static timing analysis based on the parasitic parameter 31, the first IR drop information 33, and the first delay information 36 to generate timing information 32;

[c] performing a dynamic IR drop analysis for the semiconductor integrated circuit based on the layout data to generate second IR drop information 34 and performing a delay calculation in consideration of a dynamic IR drop based on the timing information 32 and the second IR drop information 34 to generate second delay information 37;

[d] performing the delay calculation in consideration of crosstalk based on the parasitic parameter 31 and the timing information 33 to generate third delay information 38; and

[e] performing timing verification based on the first delay information 36, the second delay information 37, and the third delay information 38 to determine whether the timing of the semiconductor integrated circuit is converged.

A power noise cycle is obtained by analyzing the dynamic IR drop and a delay of a delay pass is a multiple of the noise cycle. Thereby, the delay increment and the delay decrement of the power noise amount (delay time×power noise amplitude) received when an internal signal of the semiconductor integrated circuit passes through a delay pass circuit are approximately the same. Since the delay increment is approximately equal to the delay decrement, the jitter can be reduced.

With the exemplary aspect of the present invention, the timing convergence can be performed with higher accuracy at the time of designing the semiconductor integrated circuit.

BRIEF DESCRIPTION OF THE DRAWINGS

The above and other exemplary aspects, advantages and features of the present invention will be more apparent from the following description of certain exemplary embodiments taken in conjunction with the accompanying drawings, in which:

FIG. 4 is a flow chart illustrating an operation of a dynamic IR drop analysis;

FIG. 5 is a circuit diagram illustrating a configuration of a delay pass circuit 41;

FIG. 8 is a graph illustrating a relationship between a jitter caused when the power noise is overlapped on the delay pass circuit and a delay value; and FIG. 9 is a flow chart illustrating an operation of a second exemplary embodiment.

DETAILED DESCRIPTION OF THE EXEMPLARY EMBODIMENTS

First Exemplary Embodiment

Figure 1:
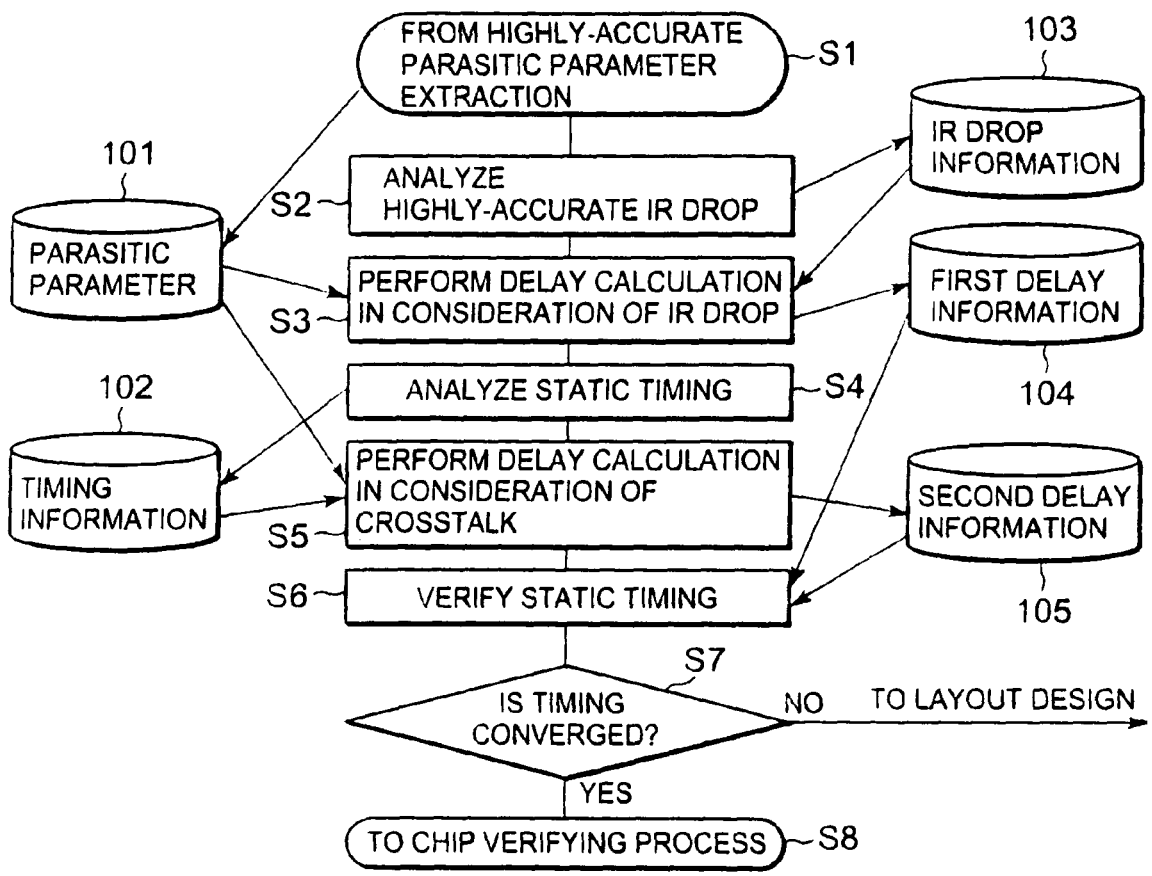
FIG. 1 is a flow chart illustrating a timing verification flow and a delay calculation in consideration of SI (Signal Integrity) of the related art.
Figure 2:
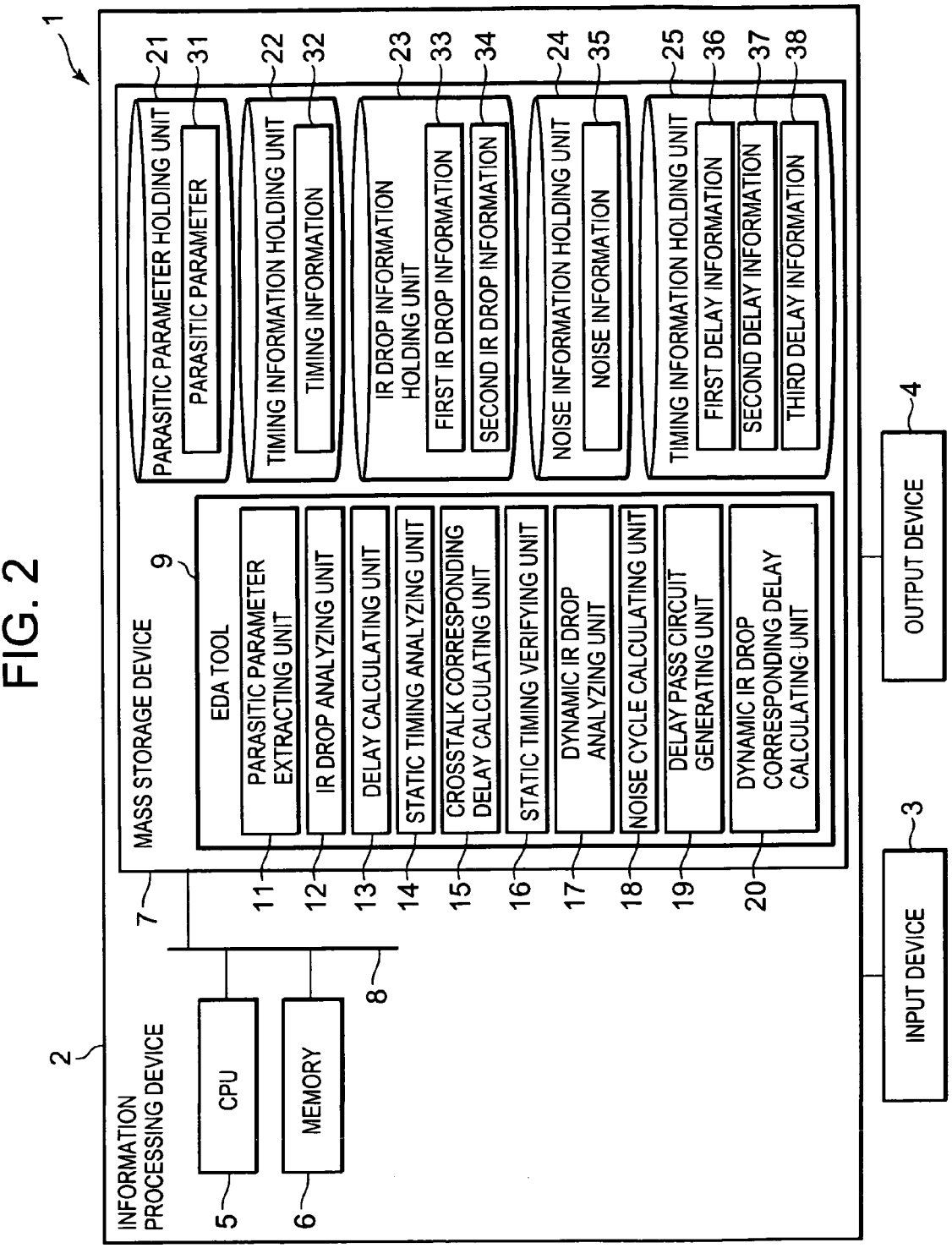
FIG. 2 is a block diagram illustrating a configuration of an apparatus 1 for supporting a semiconductor design.

FIG. 2 is a block diagram illustrating a configuration of an apparatus 1 for supporting a semiconductor design according to a first exemplary embodiment. The apparatus 1 for supporting a semiconductor design includes an information processing device 2, an input device 3, and an output device 4. The information processing device 2 is connected to the input device 3 and the output device 4.

The information processing device 2 is an apparatus that is operated according to a sequence represented by a computer program, which can perform the information process at high speed. The information processing device 2 includes five basic functions, for example, input, store, operation, control, and output. The input device 3 is a man-machine interface that inputs data to the information processing device 2. The output device 4 is a man-machine interface that outputs the processing results of the information processing device 2 to the outside.

Referring to FIG. 2, the information processing device 2 includes a CPU 5, a memory 6, and a mass storage device 7, which are connected to one another via a bus 8. The CPU 5 performs a data process or a control of various devices that are included in the information processing device 2. The CPU 5 analyzes and operates data received from the input device 3, etc. and outputs the operated results to the output device and the like. The memory 6 is a storage device that stores data. A representative example of the storage device may include RAM and the like. The memory 6 is used when the CPU 5 performs an operation process. The mass storage device 7, which is a storage device represented as a Hard Disk Drive (HDD), stores information or data that are associated with the first exemplary embodiment.

The mass storage device 7 includes an EDA tool 9, a parasitic parameter holding unit 21, a timing information holding unit 22, an IR drop information holding unit 23, a noise information holding unit 24, and a delay information holding unit 25. The EDA tool 9 includes a parasitic parameter extracting unit 11, an IR drop analyzing unit 12, a delay calculating unit 13, a static timing analyzing unit 14, a crosstalk corresponding delay calculating unit 15, a static timing verifying unit 16, a dynamic IR drop analyzing unit 17, a noise cycle calculating unit 18, a delay pass circuit generating unit 19, and a dynamic IR drop corresponding delay calculating unit 20.

The parasitic parameter holding unit 21 holds a parasitic parameter 31. The timing information holding unit 22 holds timing information 32. The IR drop information holding unit 23 holds first IR drop information 33 and second IR drop information 34. The noise information holding unit 24 holds noise information 35. The delay information holding unit 25 holds first delay information 36, second delay information 37, and third delay information 38.

Figure 3:
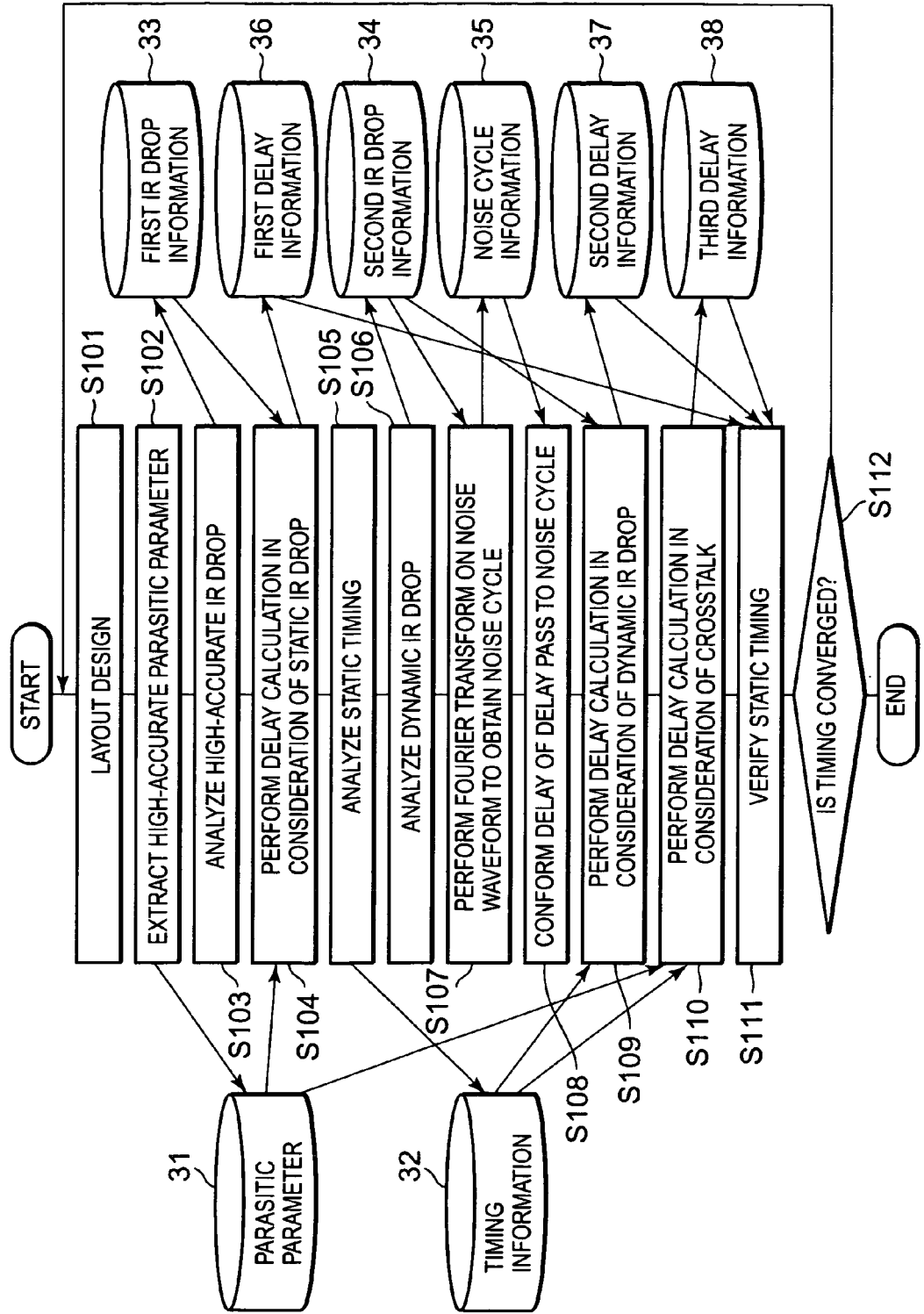
FIG. 3 is a flow chart illustrating an operation of a first exemplary embodiment.

FIG. 3 is a flow chart illustrating an operation of the first exemplary embodiment. At step S101, the layout design is performed in consideration of SI (integrity of a signal waveform called Signal Integrity). As step S101, the layout is determined by considering a chip·PKG specification of the decoupling capacity inside the semiconductor integrated circuit, the configuration, size, and terminal arrangement of an LSI package that connects an internal signal of the semiconductor integrated circuit to an external signal of the LSI, load information that is connected outside the LSI package, the number and arrangement information of power supplies/Gnds/signals outside the LSI, a chip condenser that is connected between the power supply/GND outside the LSI, information on current consumption inside the semiconductor integrated circuit, information, such as information on a size and information on an operating frequency of the semiconductor integrated circuit and the like.

At step S102, the highly-accurate parasitic parameter extraction process is performed to extract the parasitic parameter 31 based on the designed layout. At step S103, the highly-accurate IR drop analysis process is performed to calculate the first IR drop information 33. At step S104, the delay calculation is performed in consideration of the IR drop based on the extracted parasitic parameter 31 and the calculated first IR drop information 33. At a process of step S104, results obtained by performing the delay calculation are stored as the first delay information 36.

At step S105, the static timing analysis is performed based on the above-mentioned information. At step S105, the timing relationship between all the signal lines and a signal line that may be a noise source is extracted and output as timing information 32.

At step S106, the dynamic IR drop analysis that performs a transient analysis of power supply voltage is performed by power noise simulation based on a power supply circuit model and a noise source model to generate the second IR drop information 34.

At step S107, a continuous spectrum of frequency components in the noise waveform is obtained by performing Fourier transform on a power noise waveform based on the second IR drop information 34 and a maximum frequency band of an amplitude spectrum based on the obtained results is read as the noise cycle, thereby making noise information 35.

At step S108, the delay pass circuit, which sets the delay, is formed so that the delay of the signal line is N times (N=integral number) as large as the noise cycle by the prepared noise information 35. At step S109, the delay calculation is performed in consideration of the dynamic IR drop based on the formed delay pass circuit, the second IR drop information 34, and the timing information 32. At step S109, the delay calculation results of the signal line having an effect on the IR drop makes the second delay information 37, which is information different from the first IR drop information 33.

At step S110, the delay calculation is performed in consideration of crosstalk based on the parasitic parameter 31 and the timing information 32 to output the delay calculation results of a network affected by the crosstalk as the third delay information that is information different from the first IR drop information 33.

At step S111, the static timing verification is performed based on the first delay information 36 and the second delay information 37 and the third delay information 38 are different information. At step S112, whether or not the timing is converged is determined based on the verification results. If the timing is converged, the process ends. If the timing is not converged, the process returns to the layout design (step S101) and thus, the above-mentioned operations are repeated.

By a series of sequences as described above, the timing convergence is completed by performing the timing verification while considering both the IR drop and the crosstalk.

FIG. 4 is a flow chart illustrating the operation of the dynamic IR drop analysis. At step S201, impedance of a current path is modeled to prepare the power supply circuit model based on the power information that represents the power supply circuit of the semiconductor integrated circuit as resistance, capacity, and inductance, the decoupling capacity, the package information that represents the LSI package as resistance, capacity, and inductance, the load information that is connected outside the LSI package, and the number and arrangement information of power supplies/Gnds/signals outside the LSI.

At step S202, the noise source model is prepared based on a floor plan inside the semiconductor integrated circuit, the information on current consumption, and the information on the operation frequency. At step S203, the power noise simulation is performed based on the prepared power supply circuit model and the prepared noise source model. At step S204, the results obtained by performing the transient analysis of the power supply voltage by the power noise simulation are output as the second IR drop information 34.

FIG. 5 is a circuit diagram illustrating a configuration of a delay pass circuit model 41. The delay pass circuit model 41 includes a delay pass circuit 42, an input terminal 43 that supplies an input signal to the delay pass circuit 42, an output terminal 44 that receives an output signal output from the delay pass circuit 42, and a power supply line 45 that supplies power supply voltage.

The delay pass circuit 42 includes a first inverter I1, a second inverter I2, a third inverter I3, and a fourth inverter I4. An input terminal of the first inverter I1 is connected to an input terminal 43. An output terminal of the first inverter I1 is connected to the input terminal of the second inverter I2 via a first node N1. An output terminal of the second inverter I2 is connected to the input terminal of the third inverter I3 via a second node N2. An output terminal of the third inverter I3 is connected to the input terminal of the fourth inverter I4 via a third node N3. An output terminal of the fourth inverter I4 is connected to an output terminal 44. The power supply line 45 is connected to the first inverter I1, the second inverter I2, the third inverter I3, and the fourth inverter I4, respectively.

The input signal, which is input to the delay pass circuit 42 via the input terminal 43, is transmitted to the first inverter I1, the second inverter I2, the third inverter I3, and the fourth inverter I4 in order and then output via the output terminal 44.

Figure 6:
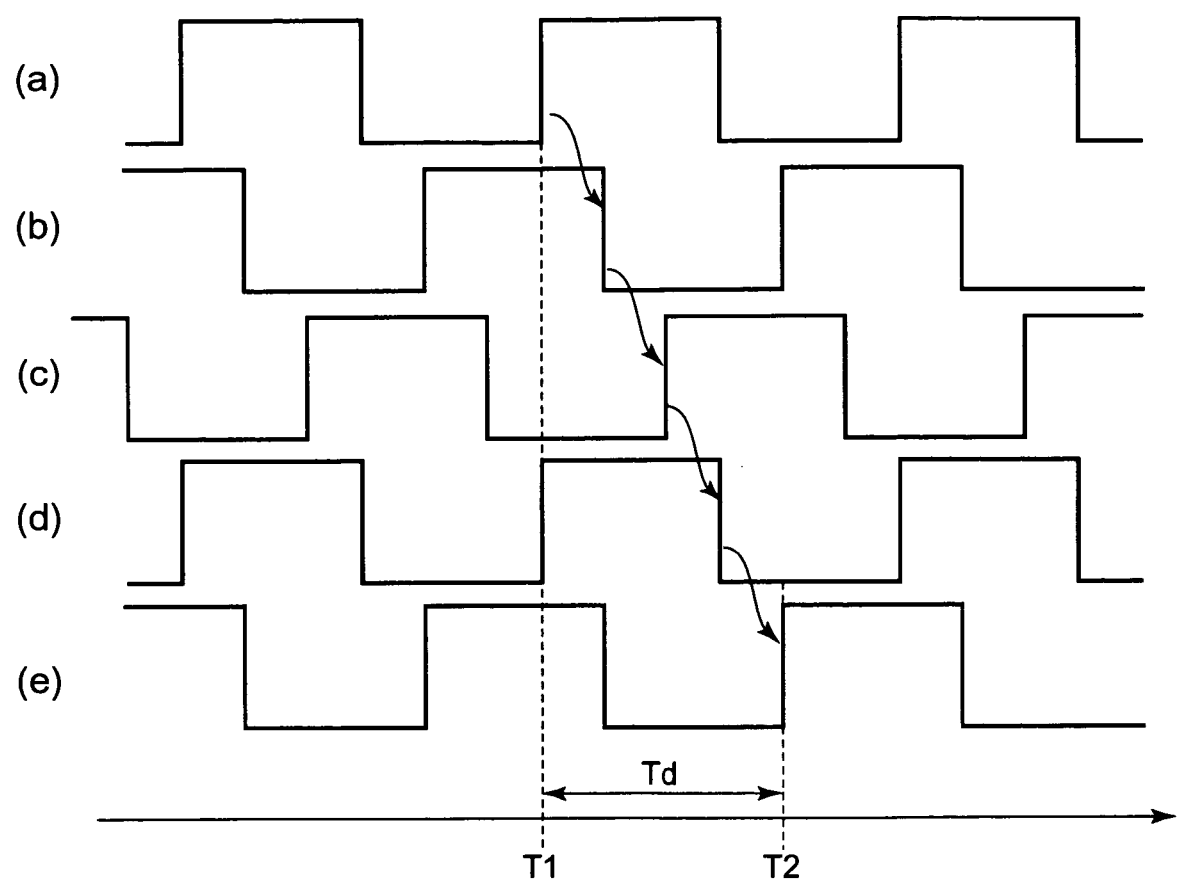
FIG. 6 is a timing chart illustrating an operation of a delay pass circuit model 41.

FIG. 6 is a timing chart illustrating the operation of the delay pass circuit model 41. FIG. 6A illustrates a time course of the input signal that is supplied to the delay pass circuit 42. FIG. 6B illustrates a time course of the first node N1 changed in response to the input signal that is supplied to the delay pass circuit 42. FIG. 6C illustrates a time course of the second node N2 in response to the change in the first node N1. FIG. 6D illustrates a time course of the third node N3 in response to the change in the second node N2. FIG. 6E illustrates a time course of the output signal output from the delay pass circuit 42 in response to the change in the third node N3. The difference between time T1 and time T2 is a delay time Td from the input terminal 43 to the output terminal 44.

Figure 7:
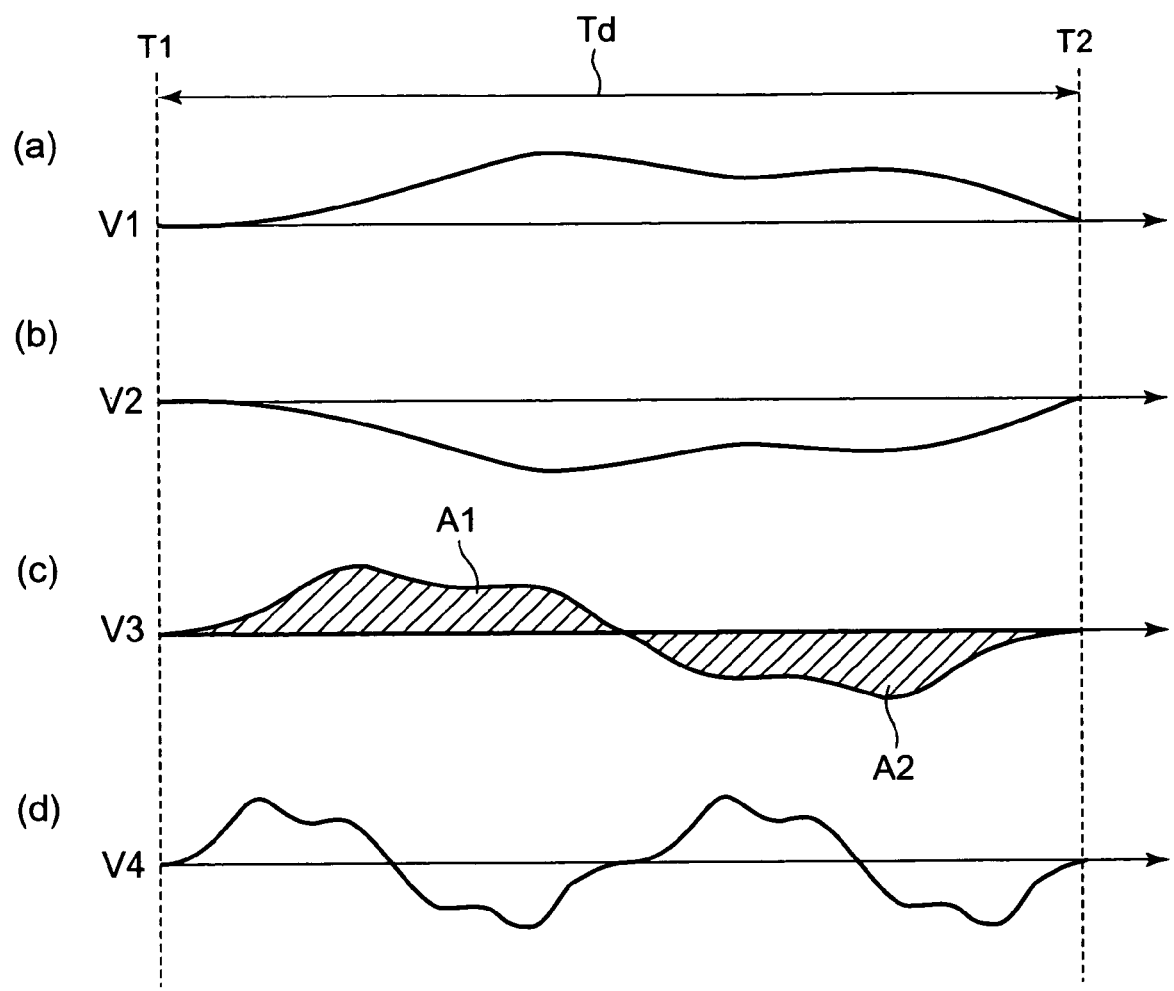
FIG. 7 is a waveform diagram illustrating a power noise of a semiconductor integrated circuit configured of a delay pass circuit.

FIG. 7 is a waveform diagram illustrating the power noise of the semiconductor integrated circuit configured of the delay pass circuit. FIG. 7A illustrates power supply voltage V1 when the power noise is larger than the power supply voltage throughout time T1 to time T2. FIG. 7B illustrates power supply voltage V2 when the power noise is smaller than the power supply voltage throughout time T1 to time T2. FIG. 7C illustrates power supply voltage V3 when the power noise is larger than the power supply voltage in area A1 and smaller than the power supply in area A2 throughout time T1 to time T2. FIG. 7D illustrates power supply voltage V4 when the power noise is fluctuated at a cycle two times as large as the power supply voltage V3 throughout time T1 to T2.

In the delay time that transmits the internal signal from the input terminal 43 to the output terminal 44, since the power supply voltage V1 has a voltage higher than a case where there is no power noise, the delay value is relatively smaller than a case where there is no power noise. In contrast, when the power supply voltage V2 is voltage lower than a case where there is no power noise, the delay value is relatively larger than a case where there is no power noise. Therefore, in the power supply voltage V1 and the power supply voltage V2, the jitter, which is the fluctuation of the temporal delay value of the signal phase, becomes large.

Also, the power supply voltage V3 when the power supply voltage is high is in area A1 and when the power supply voltage is low is in area A2. For this reason, in the first inverter I1 and the second inverter I2, the delay value is relatively smaller than the case where there is no power noise and in the third inverter I3 and the fourth inverter I4, the delay value is relatively larger than the case where there is no power noise. Therefore, since the delay value is approximately linear with respect to the fluctuation of the power supply voltage, the increment of the delay value is approximately equal to the decrement of the delay value. The fluctuations of the delay value due to the power noise are offset with each other, such that it is approximately equal to the delay value in the case where there is no power noise.

Similarly, the power supply voltage V4 has a cycle two times as large as the power supply voltage V3. In the first inverter I1 and the third inverter I3, the delay value is relatively smaller than the case where there is no power noise and in the second inverter I2 and the fourth inverter I4, the delay value is relatively larger than the case where there is no power noise. For this reason, in the case where the delay value is considered as a total of delay value from the input terminal 43 to the output terminal 44, the increment and decrement of the delay value due to the power noise are offset with each other, such that it is approximately equal to the delay value in the case where there is no power noise. The cycle of the power supply voltage V3 and the delay value of the delay pass circuit are the same and even for the power supply voltage having the cycle N times (N=integral number) as much as the power supply voltage V3, the increment and decrement of the delay value due to the power noise are offset with each other by the same principle, such that it is approximately equal to the delay value in the case where there is no power noise.

According to the foregoing description, the power noise cycle is obtained from the dynamic IR drop analysis and the layout of the semiconductor integrated circuit, which makes the delay of the delay pass N times (N=integral number) as large as the noise cycle, is performed. Thereby, the delay increment and delay decrement of the power noise amount (delay time×power noise amplitude) received when the internal signal of the semiconductor integrated circuit passes through the delay pass circuit are approximately the same and when the total delay circuit is considered, the increment and decrement of the delay value are offset with each other, making it possible to reduce the jitter.

FIG. 8 is a graph illustrating a relationship between the jitter caused when the power noise is overlapped on the delay pass circuit and the delay value. Referring to FIG. 8, when comparing a first delay setting value D1 that is a half of the noise cycle maximally affected by the power noise and a second delay setting value D2 that is N times as large as the noise cycle by applying the above-mentioned exemplary embodiment, it illustrates that the jitter can be approximately reduced by 80%.

Second Exemplary Embodiment

FIG. 9 is a flow chart illustrating an operation of a second exemplary embodiment. The operation of the second exemplary embodiment includes a process of changing, repeating, and verifying the delay value of the delay circuit in addition to the operation of the first exemplary embodiment. Further, other operations are the same as the first exemplary embodiment and therefore, the detailed description thereof will be omitted.

Referring to FIG. 9, at step S111, after the static timing verification is performed, the process proceeds to step S113. At step S113, the noise cycle is confirmed from the results obtained by performing Fourier transform on the power noise to determine whether or not there is no noise cycle that is not set in the delay of the delay circuit. When the noise cycle that is not set in the delay of the delay circuit is confirmed according to the determination result, the process proceeds to step S115.

At step S115, after the delay pass circuit resetting delay is made so that the delay of the signal line is N times (N=integral number) as large as the noise cycle as a new noise cycle, the process returns to step S109 and performs the delay calculation in consideration of the dynamic IR drop again.

When there is no noise cycle that is not set in the delay of the delay circuit according to the determination result of step S113, the process proceeds to step S114.

At step S114, the optimally converged timing is selected from all the performed timing verification and the process proceeds to step S112. At step S112, the determination on the timing convergence is performed and when the timing is not converged, the process proceeds to step S116.

At step S116, after the specification of the chip package is reviewed again, the process returns to step S101. At step S112, when the timing is converged, the process ends.

When the jitter of the delay pass circuit has the frequency dependence on the power supply voltage noise and there are a plurality of noise cycles, the jitter has a possibility of being largely affected by the noise cycle other than the noise cycle when the delay is set. For the power supply voltage noise having a plurality of large amplitude spectra, the delay is set in each noise cycle and it is possible to perform the delay setting, which reduces the jitter, by performing the repetitive verification. Further, a combination of the plurality of exemplary embodiments as described above can be practiced within the range where the composition and operation are not contradicted.

Further, it is noted that Applicant's intent is to encompass equivalents of all claim elements, even if amended later during prosecution.

What is claimed is:

1. A method of designing a semiconductor integrated circuit, said method comprising:
    extracting a parasitic parameter of the semiconductor integrated circuit, based on a layout data of the semiconductor integrated circuit;
    generating a timing information, by performing a highly-accurate IR drop analysis on the semiconductor integrated circuit based on the layout data, generating a first delay information based on a first IR drop information obtained by performing the highly-accurate IR drop analysis and the parasitic parameter, and performing a static timing analysis based on the parasitic parameter, the first IR drop information, and the first delay information, the first IR drop information comprising static information;
    generating a second delay information by performing a dynamic IR drop analysis for the semiconductor integrated circuit based on the layout data to generate a second IR drop information and performing a delay calculation in consideration of a dynamic IR drop based on the timing information and the second IR drop information, the second IR drop information comprising dynamic information, the highly-accurate IR drop analysis being a different analysis from the dynamic IR drop analysis;
    generating a third delay information by performing the delay calculation in consideration of a crosstalk based on the parasitic parameter and the timing information;
    performing a timing verification based on the first delay information, the second delay information, and the third delay information to determine whether a timing of the semiconductor integrated circuit is converged; and
    calculating a noise cycle of the semiconductor integrated circuit by a computer, using a noise cycle calculating unit included in an information processing device; based on the second IR drop information to generate a noise cycle information, and determining a delay value of a delay circuit, using a delay pass circuit generating unit included in the information processing device, based on the noise cycle information,
    wherein the generating the third delay information performs the delay calculation, using a delay calculating unit included in the information processing device, in consideration of the dynamic IR drop based on the delay circuit, which determines the delay value based on the noise cycle, to generate the second delay information.

2. The method according to claim 1, wherein the generating the second delay information includes:
    generating a power supply circuit model of the semiconductor integrated circuit based on the layout data;
    generating a noise source model of the semiconductor integrated circuit based on the layout data; and
    performing a power noise simulation based on the power, supply circuit model and the noise source model, and generating the second IR drop information based on a result obtained by performing a transient analysis on a power supply voltage.

3. The method according to claim 2, wherein the calculating the noise cycle of the semiconductor integrated circuit includes:
    performing a fourier transform on a power noise waveform based on the second IR drop information to calculate a continuous spectrum of frequency components in the power noise waveform and generating the noise cycle information, as the noise cycle, using a maximum frequency band of an amplitude spectrum obtained based on the continuous spectrum of the frequency components; and configuring the delay circuit by which a delay of a signal line is an integer multiple of the noise cycle based on the noise cycle information.

4. The method according to claim 3, wherein the performing the timing verification includes:

determining whether there is a noise cycle that is not set in the delay of the delay circuit;

if there is the noise cycle that is not set in the delay according to a result of said determining, then reconfiguring a new delay circuit that resets the delay of the delay circuit; and if there is no noise cycle that is not set in the delay according to a result of said determining, then selecting the delay circuit where the timing is optimally converged from a performance result obtained by performing the timing verification to determine whether the timing of the semiconductor integrated circuit including the selected delay circuit is converged, wherein the generating the second delay information includes:

performing the delay calculation in consideration of the dynamic IR drop based on a new delay circuit to generate the second delay information.

5. An apparatus for supporting a design of a semiconductor integrated circuit, said apparatus comprising:

a parasitic parameter extracting unit that extracts a parasitic parameter of the semiconductor integrated circuit based on a layout data of the semiconductor integrated circuit;

an IR drop analyzing unit that performs a highly-accurate IR drop analysis on the semiconductor integrated circuit based on the layout data to generate a first IR drop information comprising static information;

a first delay calculating unit that generates a first delay information based on the parasitic parameter and the first IR drop information;

a timing analyzing unit that performs a static timing analysis based on the parasitic parameter, the first IR drop information, and the first delay information to generate a timing information;

a dynamic IR drop analyzing unit that performs a dynamic IR drop analysis on the semiconductor integrated circuit based on the layout data to generate a second IR drop information comprising dynamic information, the highly-accurate IR drop analysis being a different analysis from the dynamic IR drop analysis;

a second delay calculating unit that performs a delay calculation in consideration of the dynamic IR drop based on the timing information and the second IR drop information to generate a second delay information;

a crosstalk corresponding delay calculating unit that performs the delay calculation in consideration of a crosstalk based on the parasitic parameter and the timing information to generate a third delay information;

a timing verifying unit that performs a timing verification based on the first delay information, the second delay information, and the third delay information to determine whether a timing of the semiconductor integrated circuit is converged;

a noise cycle calculating unit that calculates a noise cycle of the semiconductor integrated circuit to generate a noise cycle information based on the second IR drop information; and a delay pass circuit generating unit that determines a delay value of a delay circuit based on the noise cycle information, wherein the second delay calculating unit performs the delay calculation in consideration of the dynamic IR drop based on the delay circuit determining the delay value based on the noise cycle to generate the second delay information.

6. The apparatus according to claim 5, wherein the dynamic IR drop analyzing unit performs a power noise simulation based on, a power supply circuit model and a noise source model of the semiconductor integrated circuit that are generated based on the layout data and generates the second IR drop information based on a result obtained by performing a transient analysis on a power supply voltage that is obtained from the power noise simulation.

7. The apparatus according to claim 6, wherein the noise cycle calculating unit performs a fourier transform on a power noise waveform, based on the second IR drop information to calculate a continuous spectrum of frequency components in the power noise waveform, and generates the noise cycle information, as the noise cycle, using a maximum frequency band of an amplitude spectrum obtained based on the continuous spectrum of the frequency components, and wherein the delay pass circuit generating unit configures the delay circuit by which a delay of a signal line is an integer multiple of the noise cycle based on the noise cycle information.

8. The apparatus according to claim 7, wherein the timing verifying unit determines whether there is a noise cycle that is not set in the delay of the delay circuit, wherein, if there is the noise cycle that is not set in the delay, then the timing verifying unit configures a new delay circuit that resets the delay of the delay circuit, wherein, if there is no noise cycle that is not set in the delay, then the timing verifying unit selects the delay circuit where the timing is optimally converged from a performance result obtained by performing the timing verification to determine whether a timing of the semiconductor integrated circuit including the selected delay circuit is converged, and wherein the second delay calculating unit performs the delay calculation in consideration of the dynamic IR drop based on a new delay circuit to generate the second delay information.

* * * * *